United States Patent [19]
Donnelly

[11] Patent Number: 5,921,592
[45] Date of Patent: Jul. 13, 1999

[54] DUCT JOINER AND RETAINING CLIP THEREFOR

[75] Inventor: William James Donnelly, Ivanhoe, Australia

[73] Assignee: Talana Investments Limited, Tortola, Virgin Islands (Br.)

[21] Appl. No.: 08/810,320

[22] Filed: Feb. 28, 1997

Related U.S. Application Data

[63] Continuation-in-part of application No. 08/561,196, Nov. 21, 1995, abandoned.

[51] Int. Cl.$^6$ ...................................................... F16L 37/12
[52] U.S. Cl. ........................... 285/340; 285/239; 285/257; 285/131.1
[58] Field of Search ..................................... 285/340, 322, 285/243, 258, 104, 105, 239, 240, 257, 371

[56] References Cited

U.S. PATENT DOCUMENTS

| | | | |
|---|---|---|---|
| 589,216 | 8/1897 | McKee | 285/239 |
| 2,142,768 | 1/1939 | Tompkins | 285/257 |
| 2,225,208 | 12/1940 | Crickmer . | |
| 2,457,077 | 12/1948 | Woolsey . | |
| 2,739,615 | 3/1956 | Wurzel . | |
| 2,921,606 | 1/1960 | McCauley | 285/257 |
| 3,221,746 | 12/1965 | Noble | 285/239 |
| 3,712,649 | 1/1973 | Martin . | |
| 3,773,360 | 11/1973 | Timbers . | |
| 3,920,270 | 11/1975 | Babb, Jr. . | |
| 3,997,196 | 12/1976 | Karcher et al. . | |
| 4,099,749 | 7/1978 | van Vliet . | |
| 4,105,226 | 8/1978 | Frey et al. . | |
| 4,411,302 | 10/1983 | Kuypers . | |
| 4,471,978 | 9/1984 | Kramer . | |
| 4,491,124 | 1/1985 | Goettel . | |
| 4,610,468 | 9/1986 | Wood . | |
| 4,613,172 | 9/1986 | Schattmaier . | |
| 4,643,466 | 2/1987 | Conner et al. . | |
| 4,997,213 | 3/1991 | Traner et al. | 285/131.1 |
| 5,009,454 | 4/1991 | Bartholomew . | |
| 5,064,227 | 11/1991 | Spors et al. . | |
| 5,213,377 | 5/1993 | Humpert et al. | 285/105 |
| 5,259,650 | 11/1993 | Gnauert et al. . | |

FOREIGN PATENT DOCUMENTS

| | | | |
|---|---|---|---|
| 373272 | 9/1993 | European Pat. Off. . | |
| 2641472 | 3/1978 | Germany . | |
| 2030859 | 1/1979 | Germany . | |
| 277765 | 12/1951 | Switzerland | 285/239 |
| 596772 | 3/1978 | U.S.S.R. | 285/239 |
| 1081702 | 8/1967 | United Kingdom . | |

*Primary Examiner*—Eric K. Nicholson
*Attorney, Agent, or Firm*—Greer, Burns & Crain, Ltd.

[57] ABSTRACT

A duct joiner for connecting an air duct to another duct or other part of an air conditioning system has a tubular neck portion, a retaining clip and a sealing ring both mounted on the neck portion. The retaining clip has a ring portion received in a groove in the outer surface of the neck portion and a series of resilient teeth extending outwardly from the ring portion. The teeth are resiliently deformable to allow a hollow duct to be fitted over the neck portion and have either sharp edges or barbs thereon which dig into the internal surface of the duct to retain the duct on the neck portion of the joiner. The sealing ring has a ring section received in another groove in the outer surface of the neck portion and a resilient skirt which provides a seal between the neck portion of the joiner and the duct. The joiner may have one or more other neck portions with respective retaining clips and sealing rings for joining one duct to one or more other ducts. In other embodiments, the joiner may be provided with an air outlet portion such as a diffuser outlet.

27 Claims, 4 Drawing Sheets

DUCT JOINER AND RETAINING CLIP THEREFOR

This is a Continuation-in-Part of U.S. Patent application Ser. No. 08/561,196 filed Nov. 21, 1995 for DUCT JOINER AND RETAINING CLIP THEREFOR, now abandoned.

The present invention relates generally to ducting which is used in ducted heating systems and air conditioning systems.

Many differing forms of duct construction have been used in the past in heating and air conditioning systems. In most cases, the ducts incorporate some form of insulation. The insulating material may be added to the duct after the basic form of the duct is constructed, or the duct may itself be formed partly or wholly from an insulating material, such as polyurethane foam. In the inventor's U.S. Pat. No. 5,210,947 there is described an improved duct construction and method of manufacture in which a wire reinforcing element is embedded in a tubular casing of extruded foam plastics material.

The present invention is particularly applicable to tubular ducting which has a wall formed at least partly from a relatively soft material, such as an insulating foam plastics material. In a heating or air conditioning system which includes such tubular ducting it is particularly desirable to provide a simple, convenient and effective method of connecting ducts to each other or to other parts of the system such as air diff-users or grille outlets.

Usually the ducts are joined to the duct joiners by placing the ducts over a neck portion of the duct joiners and merely taping the duct to the duct joiner. This form of connection can easily break, is time consuming when installing ducts, and does not provide an effective sealed connection. This last deficiency results in an inefficient air conditioning system since a substantial amount of the conditioned air does not reach the space that requires the air conditioning but is lost through the connections of the duct and duct joiners.

It is therefore desirable to provide a means for connecting a duct to a duct joiner which overcomes one or more of the disadvantages of known connecting means. It is also desirable to provide a duct joiner which is relatively cheap and easy to manufacture and use.

According to one aspect of the invention, there is provided a duct joint assembly comprising an air duct of hollow form having an end and a tubular wall formed at least partly from a soft foam material extending from said end surface and having an internal surface of an internal diameter and an external surface;

a duct joiner having at least one tubular neck portion having a first open end, a second end and a through channel allowing the passage of air from one of said ends to the other, the tubular neck portion having an external diameter less than the internal diameter of the tubular wall so as to allow the first end of the neck portion to be inserted into the duct, the duct joiner having a radially extending abutment surface at the second end of the neck portion, and a retaining clip of resilient plastics material mounted to the neck portion, said retaining clip having a ring portion extending around the neck portion and a plurality of resilient projections extending outwardly from said ring portion at an angle inclined to a plane perpendicular to the longitudinal axis of the neck portion, the resilient projections having sharp edges or points thereon;

wherein in assembly of the duct joint the resilient projections flex inwardly when the neck portion of duct joiner is inserted into the duct, the end of the duct passes over the retaining clip and engages with the abutment surface of the neck portion, and the sharp edges or points of the resilient projections dig into the soft internal surface of the wall of the duct upon any movement of the duct relative to the duct joiner in a direction away from the abutment surface to restrain separation of the duct from the duct joiner.

In the assembled duct joint, it will be appreciated that a secure fitting is achieved in that the abutment surface acts as a stop to prevent movement of the duct relative to the duct joiner in one direction and the sharp edges or points of the resilient projections which dig into the soft internal surface of the wall of the duct restrain movement of the duct relative to the duct joiner in the opposite direction.

The radially extending abutment surface of the neck portion is preferably provided on an annular collar or flange extending around the neck portion.

The ring portion of the retaining clip is preferably received in an annular groove in the outer surface of the neck portion.

The resilient projections of the retaining clip are preferably in the form of teeth with spaces between side edges of adjacent teeth which allow the teeth to flex inwardly when the duct is fitted over the neck portion.

Preferably, the teeth are wider at their inner ends adjacent the ring portion and narrower at their outer ends remote from the ring portion.

In one embodiment of the invention, the outer ends of the teeth have sharp edges to dig into the soft internal surface of the tubular wall of the duct.

In another preferred embodiment, the pointed barbs are provided on the resilient projections to dig into the soft internal surface of the duct.

According to another aspect of the invention, there is provided a duct joiner for joining to an air duct of tubular form having a soft internal surface, said duct joiner having at least one neck portion providing an air channel for the passage of air through the duct joiner, and a retaining clip mounted to the neck portion;

the retaining clip having a ring portion extending around the neck portion and a plurality of resilient projections extending outwardly from the ring portion at an angle inclined to a plane perpendicular to the longitudinal axis of the neck portion, said resilient projections having pointed barbs thereon adapted to dig into the soft internal surface of the duct to retain the duct on the joiner.

The barbs are preferably provided at intermediate positions on outwardly facing surfaces of the resilient projections so that the outwardly facing surfaces abut against the internal surface of the duct wall and the barbs dig into the internal surface in the assembled duct joint assembly. This arrangement prevents the barbs from penetrating too far into the internal surface of the wall, which could cause damage to the duct wall.

A resilient seal means may also be provided for positioning around the neck of the duct joiner to seal any gap between the duct joiner and the duct when the duct is mounted over the duct and clip. Preferably, the resilient seal means comprises a sealing ring received in a groove in the outer surface of the neck portion of the joiner.

The sealing ring preferably has a ring section and a flexible skirt portion extending outwardly from the ring section at an angle inclined to the plane perpendicular to the longitudinal axis of the tubular neck portion.

In accordance with a further preferred aspect of the invention, the flexible skirt portion is arranged to extend from the ring section in a direction opposite to the direction in which the resilient projections extend from the ring portion of the retaining clip, the skirt portion having a first surface facing inwardly towards the ring portion and a second surface facing outwardly away from the ring portion before assembly of the duct on the duct portion, the flexibility of the skirt portion being such that upon movement of the duct over the neck portion the skirt portion rolls over itself so that the first surface becomes an outwardly facing surface which engages with the internal surface of the wall of the duct.

The duct joiner may have a single neck portion and an air outlet portion providing an exit channel through which air can blow into a room or the like. Alternatively, a duct joiner is accordance with the invention may have a plurality of neck portions, each provided with a retaining clip and resilient seal means, for joining one duct to at least one other duct. For instance, a duct joiner may be provided for joining ducts of different diameters, the joiner having a first generally cylindrical neck portion of one diameter and a second generally cylindrical neck portion of another diameter, each neck portion having a retaining clip and seal means. Also, a duct joiner having at least one branching neck portion in addition to main neck portions may be provided for connecting a branch duct to a main duct.

According to another aspect of the invention there is provided a method of connecting a duct to a duct joiner to provide a sealed connection therebetween, the duct joiner having a tubular neck portion, a first open end, a second open end, a through channel allowing the passage of air from one of said ends to the other, and an annular abutment collar at said second end of the neck portion, the duct having an end surface and a tubular wall formed at least partly from soft foam material, said method comprising the steps of:

fitting a retaining clip made of plastics material over the neck portion of the duct joiner, the retaining clip having a ring portion and a plurality of resilient projections extending outwardly from the ring portion, the projections having sharp points or edges thereon, fitting a sealing ring over the neck portion of the joiner;

moving the tubular duct over the neck portion, the retaining clip and the sealing ring until the end surface of the duct abuts against the collar of the neck portion; and moving the duct slightly in the opposite direction so that the sharp points or edges dig into the soft internal surface of the duct wall, to restrain separation of the duct from the duct joiner;

wherein the sealing ring seals the annular space between the neck portion and the duct.

Preferably the duct joiner includes two grooves on its neck portion and the method involves urging the retaining clip and sealing ring respectively into said grooves. The retaining clip and/or the sealing ring may be heated to expand its ring portion before being fitted onto the neck portion.

In order that the invention may be more readily understood, various embodiments thereof will now be described, by way of example only, with reference to the accompanying drawings wherein.

Figure 1:
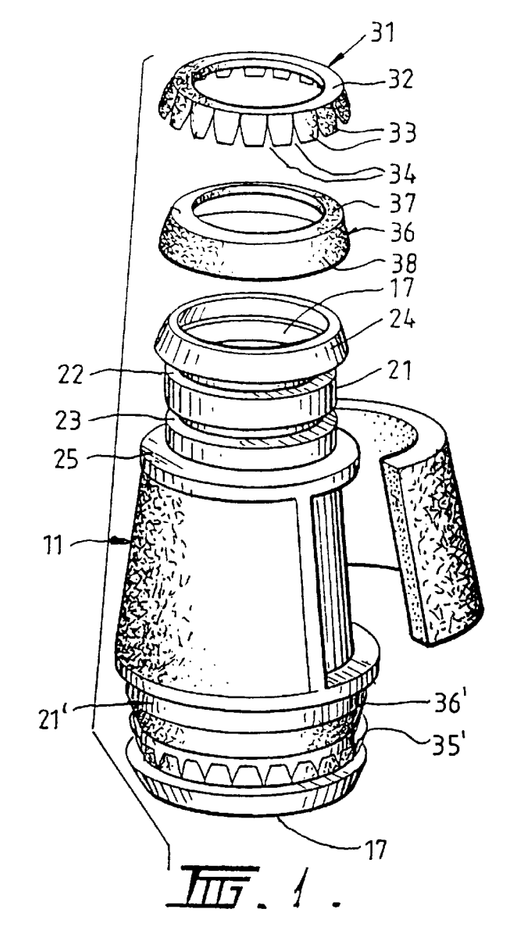
FIG. 1 a perspective view of a duct joiner and retaining clip in accordance with a first embodiment of the present invention.
Figure 2:
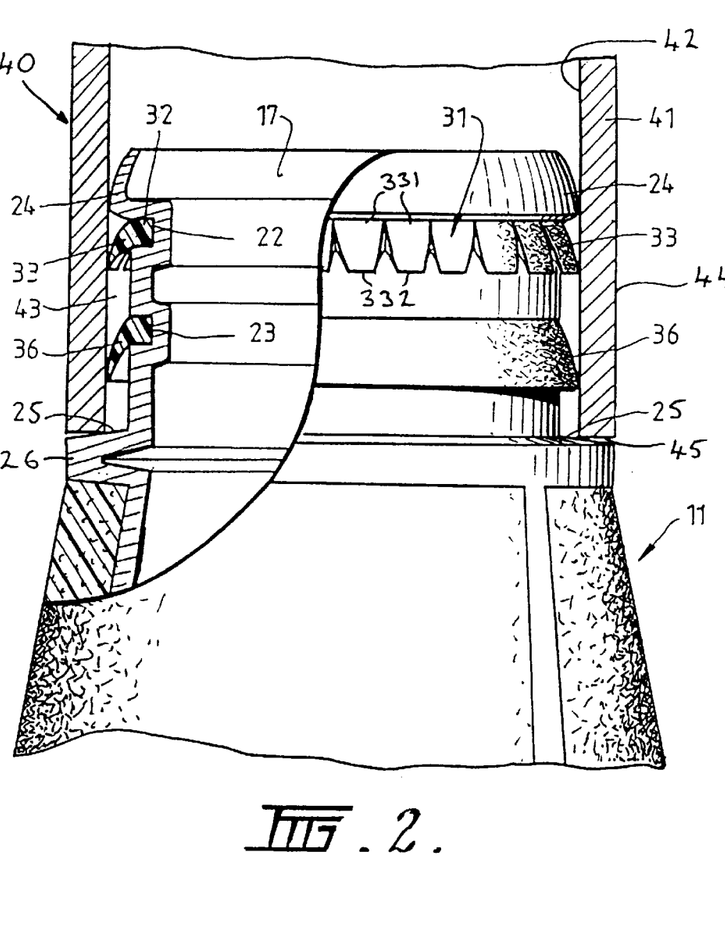
FIG. 2 is a part sectional view of the joiner and retaining clip of FIG. 1 in use.

Referring to FIGS. 1 and 2 of the drawings there is shown a duct joiner 11 which can be connected to a cylindrical air duct 40 by a retaining clip 31 and sealed by a sealing ring 36. The air duct 41 is of hollow form formed at least partly from a soft foam material having a tubular wall 41 with a soft internal surface 42 and an external surface 44.

As shown in FIGS. 1 and 2, duct joiner 11 is of tubular form having a central air channel 17 extending therethrough. At one end of the duct joiner is a generally cylindrical neck portion 21 defining an outlet portion of the air channel 17, and extending from an annular collar 25 which also encircles the air channel 17. The neck portion 21 has two substantially parallel annular grooves 22 and 23 in its outer surface and an annular retaining flange 24 at the end of the neck portion 21. The size of the neck portion 21, the retaining flange 24 and the collar 25 are such that a duct 41 can extend over the retaining flange 24 with the end of the duct 41 abutting the collar.

The retaining clip 31 comprises a central stiff ring portion 32 and a ring of resilient teeth 33 extending from its outer circumference. The teeth 33 extend partially outwards, to provide a larger circumference than the circumference of the central ring portion, and all of the teeth extend at an angle which is inclined to the plane of the central ring portion 32. The teeth 33 are wider at their inner ends 331 adjacent the ring portion and narrower at their outer ends 332 to provide lateral spaces 34 between the side edges of adjacent teeth 33 so as to allow the resilient teeth to flex inwardly to form a smaller circumference. The teeth have sharp edges at their outer ends 332. The retaining clip 31 is preferably made from a polymeric plastics material such as polypropylene, delrin or a polycarbonate material, and that can be expended upon heating but which returns to its original size and shape at normal temperatures.

The sealing ring 36 comprises a soft continuous ring section 37 with a soft continuous flexible skirt 38 extending from the outer edge of the continuous ring 37 in an outwards direction and at an angle inclined to the plane of the continuous ring 37. The sealing ring may be formed from an elastomeric material, such as rubber, or a rubberised polymeric material.

In use, the sealing ring 36 is fitted on to the neck portion 21 of the duct joiner 11 by being stretched over the retaining flange 24 and positioned in the groove 23 closest to the collar 25 such that the soft continuous flexible skirt 38 extends from the ring section 37 towards the collar 25. If required, the sealing ring 36 may be heated to expand the ring section 37 to facilitate fitting over the retaining flange 24. The retaining clip 31 may also be fitted on to the neck portion 21 of the duct joiner 11 by being heated and stretched over the retaining flange 24 and positioned in the groove 22 closest the flange 24 at the end of the duct joiner. Upon cooling the retaining clip 31 is retained in groove 22. The retaining clip 31 is oriented such that the resilient teeth 33 extend from the ring portion 32 at an inclined angle towards the collar 25. The duct 41 is then positioned over the retaining flange 24 and moved axially relative to the joiner 11 whereby the ring of resilient teeth 33 flex inwardly to present a smaller circumference and allow the duct to slide over the teeth 33 and to slide over the sealing ring 26 until the end surface 45 of the duct 41 contacts an abutment surface 26 of the collar 25 of the duct joiner 11. The teeth 33 then retain the duct in position by engaging with the internal surface 42 of the duct 41. This action is further enhanced by the direction of extension of the teeth 33 being in opposition to the direction of removal of the duct 41 from the duct joiner 11. If removal is attempted the angle of the teeth 33 will cause the sharp edges of the outer ends 332 to dig into the soft internal surface 42 of the duct 41. The retaining flange 24 at the outer end of the neck portion 21 of the duct joiner 11 ensures that the retaining clip 31 is not pulled off the neck portion 21 but is retained in the groove 22. The annular space 43 between the neck portion 21 of the duct joiner 11 and the portion of the duct 41 fitting over the neck portion 21 is sealed by the sealing ring 36 extending from the neck portion 21 to the internal surface 42 of the duct 41. Thereby air flowing through the duct 41 must proceed through the air channel 17 in the duct joiner 11.

In a modified embodiment, the positions of the retaining clip 31 and the sealing ring 36 may be reversed, with the clip 31 being located in annular groove 23 and the sealing ring 36 located in annular groove 22 adjacent the flange 24.

The other end of the duct joiner 11 shown in FIG. 1 also includes a similar neck portion 21', retaining clip 31' and sealing ring 36' for connecting the duct joiner 11 to another duct. The size of the other duct may be larger thereby requiring a larger neck portion 21' and consequently larger resilient sealing ring 36' and retaining clip 31'.

Figure 3:
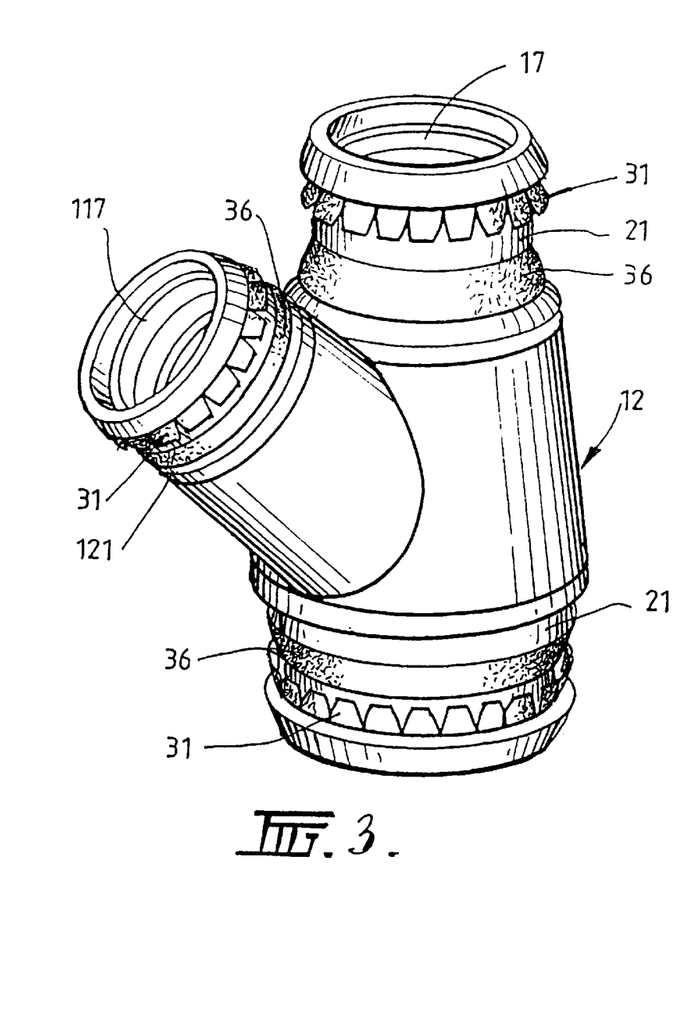
FIGS. 3, 4 and 5 are perspective views of various other duct joiners including retaining clips in accordance with the present invention.
Figure 4:
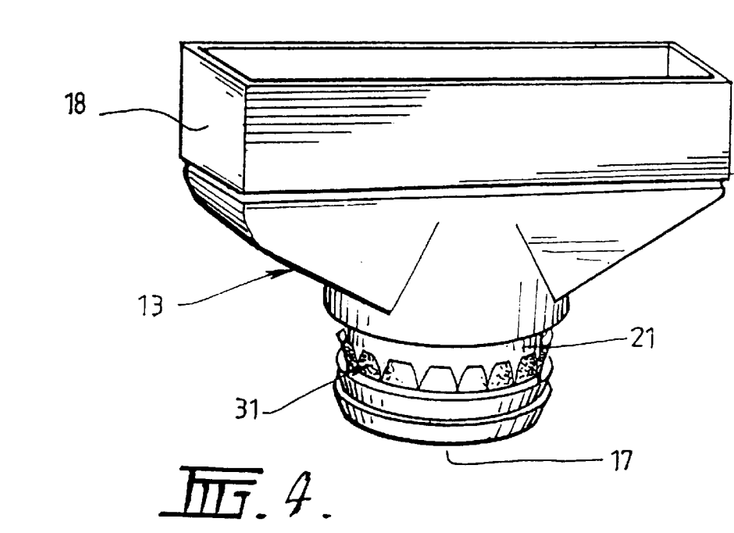
Figure 5:
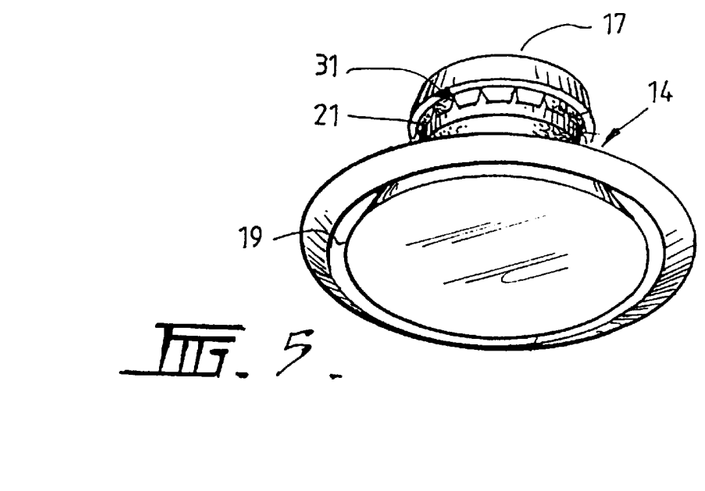

Referring to FIGS. 3, 4 and 5, other forms of duct joiners 12, 13 and 14 are shown which include similar retaining clips 31 and sealing rings 36 for connecting and sealing the joiners to ducts. Duct joiner 12 is a branch joiner having first and second co-axial neck portions 21, 21' and a branching neck portion 121 such that air flowing into the neck portion 21' can proceed to two air channels 17 and 117 in neck portions 21 and 121 respectively thereby dividing the air flow.

Duct joiner 13 comprises a floor boot having a neck portion 21 and retaining ring 31 which can be connected to a duct to allow air to flow through the air channel 17 in the duct joiner 12 and into a room or the like via an air outlet 18. Usually the air outlet 18 will be covered by a grille or other outlet diffuser. Duct joiner 14 comprises a ceiling outlet having a neck portion 21 with retaining clip 31 and sealing ring and which is also able to connect to a duct and provide an air flow path through the air channel 17 of the duct joiner 14 to a diffuser outlet 19 of the ceiling outlet.

Figure 6:
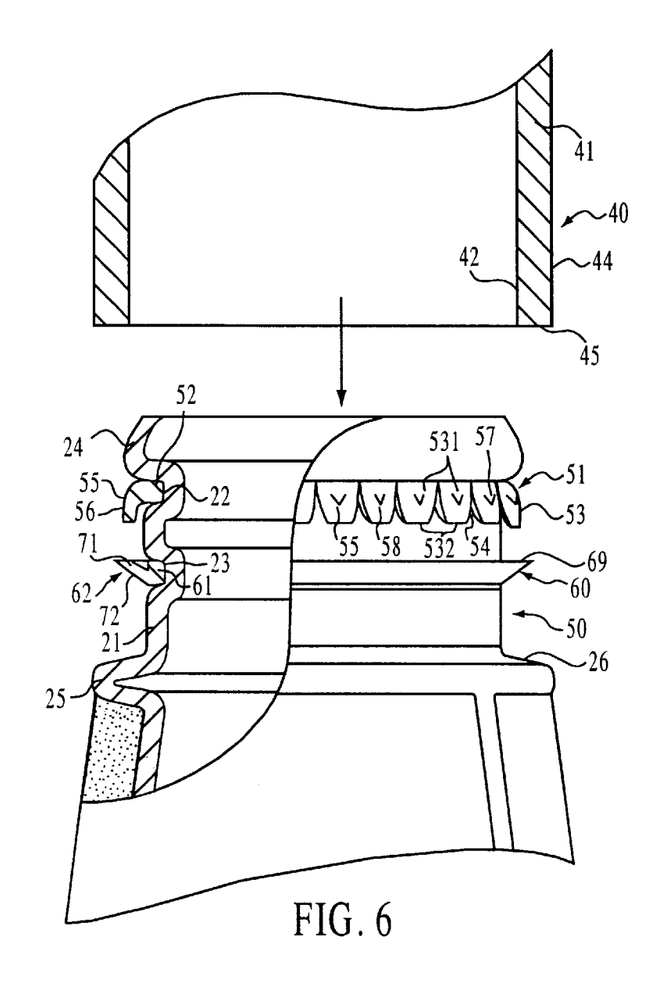
FIG. 6 is a part sectional view of a modified duct joiner in accordance with the invention.
Figure 7:
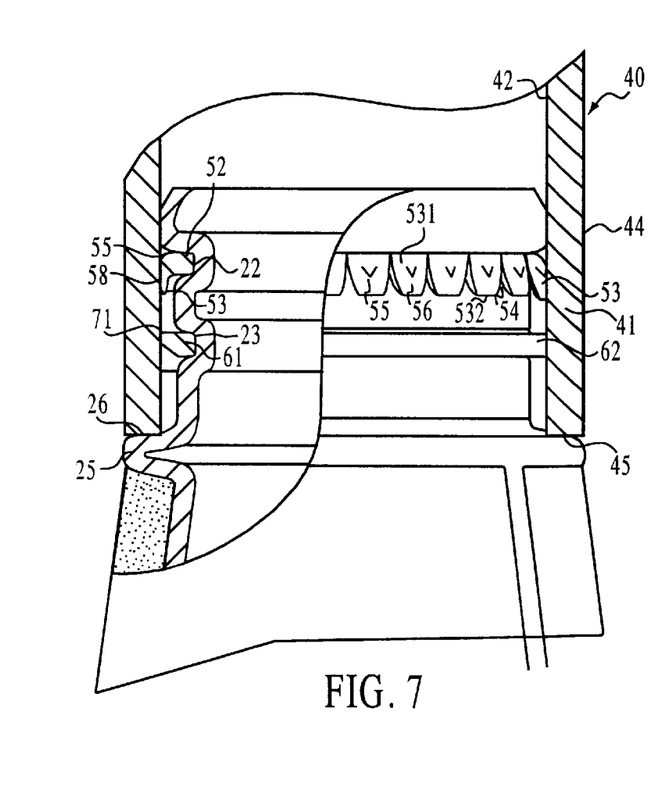
FIG. 7 is a part sectional view of the duct joiner of FIG. 6 fitted to a duct.

Referring to FIGS. 6 and 7, there is shown a modified duct joiner 50 which is generally similar to the joiner of FIGS. 1 and 2, and corresponding reference numerals have been applied to corresponding parts. The duct joiner 50 of FIGS. 6 and 7 differs from that of FIGS. 1 and 2 in that it has a modified retaining clip 51 and a modified sealing ring 60.

The retaining clip 51 is of similar form to the retaining clip 31 of the duct joiner of FIGS. 1 and 2 comprising an annular stiff ring portion 52 retained in groove 22 and a ring of resilient teeth 53 extending from the outer circumference of the ring portion 52. The teeth 53 extend partially outwards, to provide a larger circumference than the circumference of the ring portion 52 and all of the teeth extend at an angle which is inclined to the plane of the ring portion 52. The teeth 53 are wider at their inner ends 531 adjacent the ring portion and narrower at their outer ends 532 to provide lateral spaces 54 between the side edges of adjacent teeth 53 so as to allow the resilient teeth to flex inwardly to form a smaller circumference. The retaining clip 51 is preferably made from a plastics material that can be expanded upon heating but which returns to its original size and shape at normal temperatures. Suitable plastics materials from which the retaining clip 51 may be formed include moulded polymeric materials such as polypropylene, delrin or polycarbonates.

Figures 8, 9, 10, 11:
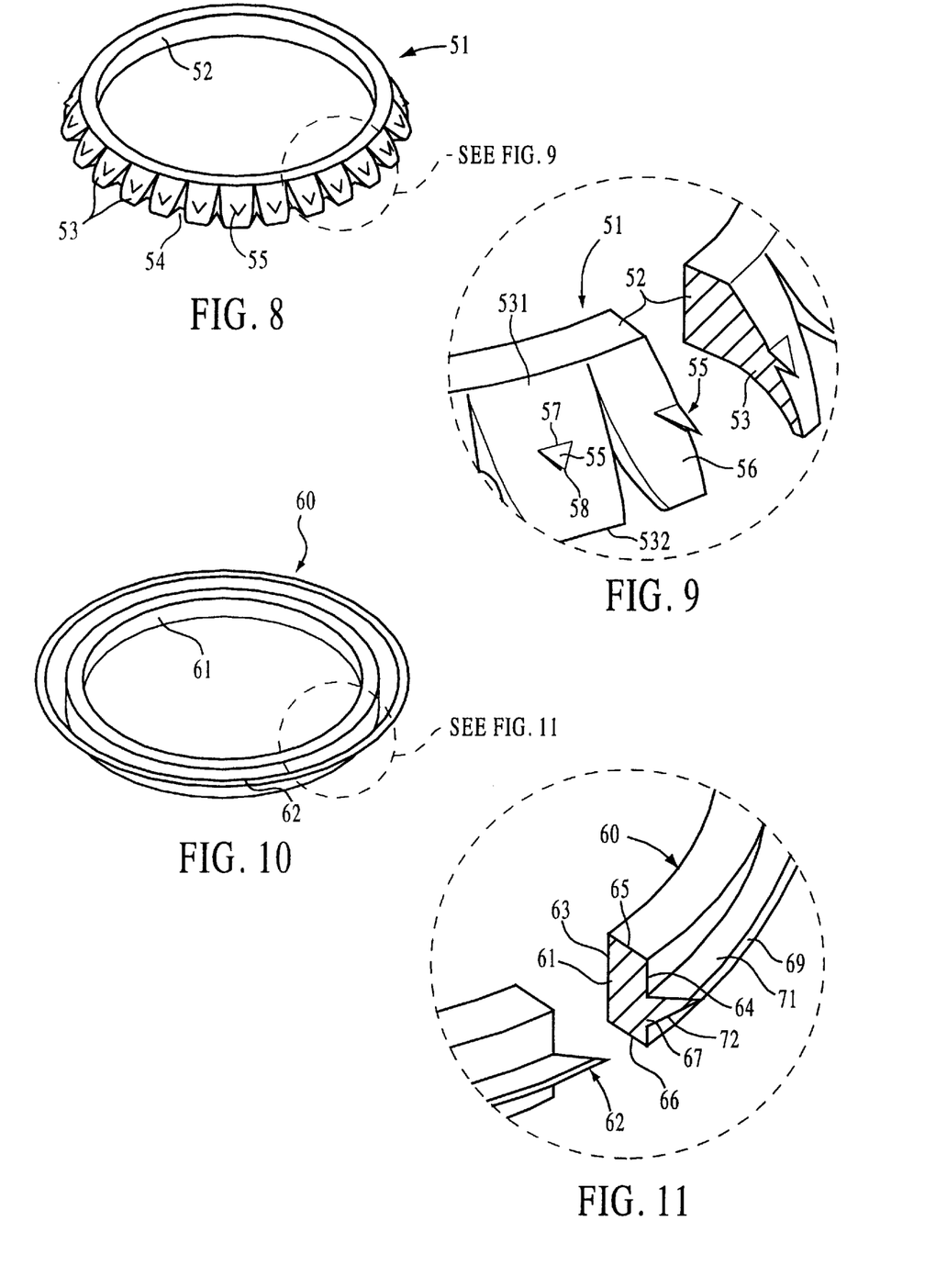
FIG. 8 is a top perspective view of the retaining clip of FIG. 6.
FIG. 9 is an enlarged broken view of part of the retaining clip of FIG. 8.
FIG. 10 is a perspective view of the seal of the duct joiner of FIG. 6.
FIG. 11 is an enlarged broken view of part of the seal of FIG. 10.

The retaining clip 51 differs from the retaining clip 31 in that an integrally formed barb 55 is provided on the external surface 56 of each of the resilient teeth 53. Each barb 55 is disposed substantially at an intermediate position between the ends 531 and 532 of its respective tooth 53 and is generally triangular in shape with the base 57 of the triangular barb 55 being joined to the external surface 56 of the tooth 53 and the apex of the barb 55 forming a sharp point 58 a short distance away from the external surface 56 of the tooth 53.

In use, as shown in FIG. 7, when a tubular duct 40 is moved axially over the retaining flange 24 of the neck portion 21 of the duct joiner 50, the contact between the outer ends 532 of the teeth and the internal surface 42 of the duct wall 41 causes the resilient teeth 53 to flex inwardly to allow the duct 40 to slide over the teeth 53 and over the seal 60 until the end surface 45 of the duct 40 contacts the abutment surface 26 of the collar 25 of the duct joiner 50.

In this position, the sharp points 58 of the barbs 55 engage the internal surface 42 of the duct wall 41 and, upon a slight movement of the duct 40 away from the duct joiner 50, the points 58 of the barbs 55 dig into the soft internal surface 42 of the duct wall 41 to restrain any further relative movement between the duct 40 and the duct joiner 50 in a direction to separate the duct 40 and duct joiner 50. Also, in the position shown in FIG. 7, the external surface 56 of each resilient tooth 53 between the barb 55 and the outer end 532 of the tooth 53 is in engagement with the internal surface 42 of the duct wall 41 to prevent the barb 55 from penetrating too far into the wall 41 of the duct 40.

The modified sealing ring 60 of the duct joiner 50 comprises a continuous annular ring section 61 and an outwardly extending annular skirt portion 62. As shown in the enlarged broken view of FIG. 11, the ring section 61 is generally rectangular in cross-section having inner and outer annular surfaces 63 and 64 and upper and lower flat surfaces 65 and 66. The skirt portion 62 is generally wedge-shaped in cross-section having a wider base 67 joined to the outer annular surface 64 at a location closer to the lower flat surface 66 than the upper flat surface 65 of the ring section 61 and a narrower outer end 68. The skirt portion 62 extends from its base 67 outwardly and upwardly at an angle inclined to the plane of the continuous ring section 61 terminating in the outer end 68 which has a small annular flat surface 69 that is in substantially the same plane as the upper flat surface 65.

The sealing ring 60 is preferably formed from an elastomeric material, such as rubber or a synthetic rubberised polymer, which enables the sealing ring 60 to be stretched over the retaining flange 24 of the neck portion 21 of the duct joiner 50 and located in the groove 23 closest to the collar 25 of the neck portion 21. As shown in FIG. 6, the sealing ring 60 is fitted in the groove 23 in such a manner that its inclined skirt portion 62 extends outwardly towards the retaining clip 51 and flange 24. Thus, the teeth 53 of the retaining clip 51 and the skirt 62 of the sealing ring 60 extend in opposite directions towards one another. When fitted in this position, the inclined skirt portion 62 has an inwardly facing surface 71 and an outwardly facing surface 72.

In use, when the tubular duct 41 is moved axially over the flange 24 and retaining clip 51, the end 46 of the duct 41 engages the small flat surface 69 of the skirt portion 62 causing the skirt portion 62 to roll over so that what was the inner surface 71 of the skirt portion in the position shown in FIG. 6 becomes an outer surface that sealingly engages the internal surface 42 of the wall of the duct 41 as shown in FIG. 7. The use of a sealing ring 60 which has a "roll over" skirt portion 62 to engage the internal surface 42 of the duct 41 provides a more effective sealing engagement than the resilient skirt 38 of the sealing ring 36.

As for the embodiment of FIGS. 1 and 2, the positions of the retaining clip 51 and the sealing ring 60 may be reversed, with the clip 51 being located in annular groove 23 and the sealing ring 60 being located in annular groove 22.

As can be seen the present invention can be used to provide a ducting system whereby a plurality of ducts and duct joiners are used and easily joined by retaining clips 31; 51 and sealed with sealing rings 36; 60. Connection of such a system does not require special tools or skills and substantially reduces the cost of such a system.

It should be evident from the description hereinabove that the present invention provides an improved duct connector and method for connecting ducts which avoids several if not all of the disadvantages of the prior art. Of course many modifications to the above described embodiments may be readily envisaged by persons skilled in the art. For instance, a duct joiner having the modified retaining clip of FIGS. 8 and 9 may have a seal of the form shown in FIGS. 1 and 2, and a duct joiner having a retaining clip as shown in FIGS. 1 and 2 may have a modified seal as shown in FIGS. 9 and 10.

Since modifications within the scope and spirit of the invention may be readily affected by persons skilled in the art, it is to be understood that the invention is not limited to the particular embodiments described, by way of example, hereinabove.

I claim:

1. A duct joint assembly comprising:
   an air duct of hollow form having an end and a tubular wall formed at least partly from a soft foam material extending from said end and having an internal diameter and an external diameter;
   a duct joiner having at least one tubular neck portion having a first open end, a second end and a through channel allowing the passage of air from one of said ends to the other, the tubular neck portion having an external diameter less than the internal diameter of the tubular wall so as to allow the first end of the neck portion to be inserted into the duct, the duct joiner having a radially extending abutment surface at the second end of the neck portion, and a retaining clip of resilient plastics material mounted to the neck portion, said retaining clip having a ring portion extending around the neck portion and a plurality of resilient projections extending outwardly from said ring portion at an angle inclined to a plane perpendicular to the longitudinal axis of the neck portion, the resilient projections having sharp edges or points and pointed barbs thereon;
   wherein in assembly of the duct joint, the resilient projections flex inwardly when the neck portion of the duct joiner is inserted into the duct, the end of the duct passes over the retaining clip and engages with the abutment surface of the neck portion, and the sharp edges or points of the resilient projections and the barbs dig into the soft internal surface of the wall of the duct upon any movement of the duct relative to the duct joiner in a direction away from the abutment surface to restrain separation of the duct from the duct joiner, the barbs are provided at intermediate positions on outwardly facing surfaces of the resilient projections so that said outwardly facing surfaces abut against the internal surface of the wall of the duct as the barbs dig into said internal surfaces.

2. A duct joint assembly according to claim 1 wherein the radially extending abutment surface is provided on an annular collar or flange extending around the neck portion.

3. A duct joint assembly according to claim 1 wherein the neck portion of the duct joiner has an inner surface, an outer surface and an annular groove in said outer surface, and said ring portion of said retaining clip is received in said annular groove.

4. A duct joint assembly according to claim 1 wherein the resilient projections of said retaining clip are in the form of teeth with spaces between side edges of adjacent teeth which allow the teeth to flex inwardly when the duct is fitted over the neck portion of the duct joiner.

5. A duct joint assembly according to claim 4 wherein the teeth are wider at their inner ends adjacent the ring portion and narrower at their outer ends remote from the ring portion of the retaining clip.

6. A duct joint assembly according to claim 5 wherein the outer ends of the teeth have sharp edges to dig into the soft internal surface of the tubular wall of the duct.

7. A duct joint assembly according to claim 3 wherein the neck portion has a further annular groove in its outer surface and a resilient sealing ring is received in said further annular groove.

8. A duct joint assembly according to claim 7, wherein said sealing ring has a ring section and a flexible skirt portion extending outwards from the ring section at an angle inclined to the plane perpendicular to the longitudinal axis of the tubular neck portion.

9. A duct joint assembly according to claim 8 wherein the flexible skirt portion of the sealing ring extends from the ring section in a direction opposite to the direction in which the resilient projections extend from the ring portion of the retaining clip, the skirt portion having a first surface facing inwardly towards the ring portion and a second surface facing outwardly away from the ring portion before assembly of the duct on the duct portion, the flexibility of the skirt portion being such that upon movement of the duct over the neck portion the skirt portion rolls over itself so that the first surface becomes an outwardly facing surface which engages with the internal surface of the wall of the duct.

10. A duct joint assembly according to claim 8 further including an air outlet portion providing an exit channel in communication with said air channel of said neck portion.

11. A duct joint assembly according to claim 9 comprising a plurality of neck portions, and a plurality of retaining clips each mounted around a respective one of said neck portions.

12. A duct joint assembly according to claim 10 for joining ducts of different diameters wherein the duct joiner has a first cylindrical neck portion of a first diameter and a second cylindrical neck portion of a second diameter, each of said neck portions having a respective clip mounted thereon.

13. A duct joint assembly according to claim 11, wherein at least one of said neck portions is a branching neck portion extending in a direction different from another one of said neck portions.

14. A duct joiner for joining to an air duct of tubular form having a soft internal surface, said duct joiner comprising at least one neck portion providing an air channel for the passage of air through the duct joiner, and a retaining clip mounted to the neck portion;

the retaining clip having a ring portion extending around the neck portion and a plurality of resilient projections extending outwardly from the ring portion at an angle inclined to a plane perpendicular to the longitudinal axis of the neck portion, said resilient projections having pointed barbs thereon adapted to dig into the soft internal surface of the duct to retain the duct on the joiner; and the barbs are provided at intermediate positions on outwardly facing surfaces of the resilient projections.

15. A duct joiner for sealably joining to an air duct of tubular form having an internal surface, said duct joiner comprising at least one neck portion providing an air channel for the passage of air through the duct joiner, a retaining clip mounted to the neck portion and adapted to engage with the internal surface of the duct to retain the duct on the duct joiner, and a sealing ring mounted to the neck portion, said sealing ring having a ring portion extending around the neck portion and a flexible skirt portion extending outwardly from the ring portion at an angle inclined to a plane perpendicular to the longitudinal axis of the neck portion, the skirt portion having a first surface facing inwardly towards the ring portion and a second surface facing outwardly away from the ring portion, wherein the flexibility of the skirt portion is such that, upon insertion of the neck portion into the end of a duct, the skirt portion rolls over so that the formerly inwardly facing first surface becomes an outwardly facing surface which engages with the internal surface of the duct.

16. A method of connecting a duct to a duct joiner to provide a sealed connection therebetween, the duct joiner having a tubular neck portion, a first open end, a second open end, a through channel allowing the passage of air from one of said ends to the other, and an annular abutment collar at said second end of the neck portion, the duct having an end surface and a tubular wall formed at least partly from soft foam material, said method comprising the steps of:

heating a retaining clip made of plastics material having a ring portion to expand the ring portion before being fitted onto the neck portion;

fitting the retaining clip over the neck portion of the duct joiner, the retaining clip having a plurality of resilient projections extending outwardly from the ring portion, the projections having sharp points or edges thereon;

fitting a sealing ring over the neck portion of the joiner;

moving the tubular duct over the neck portion, the retaining clip and the sealing ring until the end surface of the duct abuts against the collar of the neck portion; and moving the duct slightly in the opposite direction so that the sharp points or edges dig into the soft internal surface of the duct wall, to restrain separation of the duct from the duct joiner;

wherein the sealing ring seals the annular space between the neck portion and the duct.

17. A method according to claim 16 wherein said joiner is provided with grooves in said neck portion and said ring seal and said retaining clip are fitted onto said neck portion by being urged into respective ones of said grooves.

18. A method according to claim 15 wherein the sealing ring is heated before being fitted onto the neck portion.

19. A method according to claim 16 wherein the resilient projections have pointed barbs thereon which dig into the soft internal surface of the duct wall to resist separation of the duct from the duct joiner.

20. A method according to claim 19 wherein the barbs are provided at intermediate positions on outwardly facing surfaces of the resilient projections so that the outwardly facing surfaces abut against the internal surface of the duct wall as the barbs dig into said internal surface.

21. A method according to claim 16 wherein the sealing ring has a ring section and a flexible skirt portion extending outwards from the ring section at an angle inclined to the plane perpendicular to the longitudinal axis of the tubular neck portion.

22. A method according to claim 21 wherein the flexible skirt portion of the sealing ring extends from the ring section in a direction opposite to the direction in which the resilient projections extend from the ring portion of the retaining clip, the skirt portion having a first surface facing inwardly towards the ring portion and a second surface facing outwardly away from the ring portion before assembly of the duct on the duct portion, the flexibility of the skirt portion being such that upon movement of the duct over the neck portion the skirt portion rolls over itself so that the first surface becomes an outwardly facing surface which engages with the internal surface of the wall of the duct.

23. A duct joiner for use in a duct joint assembly including an air duct of hollow form having an internal wall and an external wall, said joiner comprising:

at least one tubular neck portion having an inner surface, an outer surface, a first end, a second end, a longitudinal axis and providing an air channel for the passage of air through said duct joiner;

a retaining clip mounted to said neck portion, and having a ring portion extending around said neck portion, a plurality of resilient projections extending outwardly from said ring portion at an angle inclined to a plane perpendicular to the longitudinal axis of the neck portion, so that the resilient projections flex inwardly when the air duct is moved over the neck portion, and the resilient projections engage directly with the internal wall of the duct and dig into the internal wall of the duct to restrain movement of the duct away from said duct joiner;

a resilient sealing ring having a ring section and a soft resilient skirt extending outwards from the ring section at an angle inclined to the plane perpendicular to said longitudinal axis of the said neck portion;

a first annular groove on said outer surface of said neck portion for receiving said retaining clip;

a second annular groove on said outer surface of said neck portion for receiving said resilient sealing ring;

an annular flange extending radially from said first end of said neck portion so as to be engageable by the hollow air duct when the duct is fitted over the neck portion;

an annular collar extending radially from said second end of said neck portion so as to be engageable by an end of the hollow air duct when the duct is fitted over the neck portion; and said retaining clip and said sealing ring are received in corresponding ones of said annular grooves which are disposed in an axially spaced relationship to each other between said annular flange and said annular collar.

24. A duct joint assembly comprising:

an air duct of hollow form having an end and a tubular wall formed at least partly from a soft foam material extending from said end and having an internal diameter and an external diameter;

a duct joiner having at least one tubular neck portion having a first open end, a second end and a through channel allowing the passage of air from one of said ends to the other, the tubular neck portion having an external diameter less than the internal diameter of the tubular wall so as to allow the first end of the neck portion to be inserted into the duct, the duct joiner having a radially extending abutment surface at the second end of the neck portion, and a retaining clip of resilient plastics material mounted to the neck portion, said retaining clip having a ring portion extending around the neck portion and a plurality of resilient projections extending outwardly from said ring portion at an angle inclined to a plane perpendicular to the longitudinal axis of the neck portion, the resilient projections having sharp edges or points thereon;

in assembly of the duct joint, the resilient projections flex inwardly when the neck portion of the duct joiner is inserted into the duct, the end of the duct passes over the retaining clip and engages with the abutment surface of the neck portion, and the sharp edges or points of the resilient projections dig into the soft internal surface of the wall of the duct upon any movement of the duct relative to the duct joiner in a direction away from the abutment surface to restrain separation of the duct from the duct joiner;

the neck portion of the duct joiner has an inner surface, an outer surface and an annular groove in said outer surface, and said ring portion of said retaining clip is received in said annular groove, the neck portion has a further annular groove in its outer surface and a resilient sealing ring is received in said further annular groove;

said sealing ring has a ring section and a flexible skirt portion extending outwards from the ring section at an angle inclined to the plane perpendicular to the longitudinal axis of the tubular neck portion, the flexible skirt portion of the sealing ring extends from the ring section in a direction opposite to the direction in which the resilient projections extend from the ring portion of the retaining clip, the skirt portion having a first surface facing inwardly towards the ring portion and a second surface facing outwardly away from the ring portion before assembly of the duct on the duct portion, the flexibility of the skirt portion being such that upon movement of the duct over the neck portion, the skirt portion rolls over itself so that the first surface becomes an outwardly facing surface which engages with the internal surface of the wall of the duct.

25. A method of connecting a duct to a duct joiner to provide a sealed connection therebetween, the duct joiner having a tubular neck portion, a first open end, a second open end, a through channel allowing the passage of air from one of said ends to the other, and an annular abutment collar at said second end of the neck portion, the duct having an end surface and a tubular wall formed at least partly from soft foam material, said method comprising the steps of:

fitting a retaining clip made of plastics material over the neck portion of the duct joiner, the retaining clip having a ring portion and a plurality of resilient projections extending outwardly from the ring portion, the projections having sharp points or edges thereon;

heating a sealing ring and fitting the ring over the neck portion of the joiner;

moving the tubular duct over the neck portion, the retaining clip and the sealing ring until the end surface of the duct abuts against the collar of the neck portion; and moving the duct slightly in the opposite direction so that the sharp points or edges dig into the soft internal surface of the duct wall, to restrain separation of the duct from the duct joiner; and wherein the sealing ring seals the annular space between the neck portion and the duct.

26. A method of connecting a duct to a duct joiner to provide a sealed connection therebetween, the duct joiner having a tubular neck portion, a first open end, a second open end, a through channel allowing the passage of air from one of said ends to the other, and an annular abutment collar at said second end of the neck portion, the duct having an end surface and a tubular wall formed at least partly from soft foam material, said method comprising the steps of:

fitting a retaining clip made of plastics material over the neck portion of the duct joiner, the retaining clip having a ring portion and a plurality of resilient projections extending outwardly from the ring portion, the projections having sharp points or edges and pointed barbs thereon;

fitting a sealing ring over the neck portion of the joiner;

moving the tubular duct over the neck portion, the retaining clip and the sealing ring until the end surface of the duct abuts against the collar of the neck portion; and moving the duct slightly in the opposite direction so that the sharp points or edges and the barbs dig into the soft internal surface of the duct wall, to restrain separation of the duct from the duct joiner, the barbs are provided at intermediate positions on outwardly facing surfaces of the resilient projections so that the outwardly facing surfaces abut against the internal surface of the duct wall as the barbs dig into said internal surface; and wherein the sealing ring seals the annular space between the neck portion and the duct.

27. A method of connecting a duct to a duct joiner to provide a sealed connection therebetween, the duct joiner having a tubular neck portion, a first open end, a second open end, a through channel allowing the passage of air from one of said ends to the other, and an annular abutment collar at said second end of the neck portion, the duct having an end surface and a tubular wall formed at least partly from soft foam material, said method comprising the steps of:

fitting a retaining clip made of plastics material over the neck portion of the duct joiner, the retaining clip having a ring portion and a plurality or resilient projections extending outwardly from the ring portion, the projections having sharp points or edges thereon;

fitting a sealing ring over the neck portion of the joiner, the sealing ring having a ring section and a flexible skirt portion extending outwards from the ring section at an angle inclined to the plane perpendicular to the longitudinal axis of the tubular neck portion, the flexible skirt portion of the sealing ring extending from the ring section in a direction opposite to the direction in which the resilient projections extend from the ring portion of the retaining clip, the skirt portion having a first surface facing inwardly towards the ring portion and a second surface facing outwardly away from the ring portion before assembly of the duct on the duct portion;

moving the tubular duct over the neck portion, the retaining clip and the sealing ring until the end surface of the duct abuts against the collar of the neck portion, the flexibility of the skirt portion being such that upon the movement of the duct over the neck portion, the skirt portion rolls over itself so that the first surface becomes an outwardly facing surface which engages with the internal surface of the wall of the duct;

moving the duct slightly in the opposite direction so that the sharp points or edges dig into the soft internal surface of the duct wall, to restrain separation of the duct from the duct joiner; and wherein the sealing ring seals the annular space between the neck portion and the duct.

* * * * *

UNITED STATES PATENT AND TRADEMARK OFFICE
CERTIFICATE OF CORRECTION

PATENT NO. : 5,921,592
DATED : July 13, 1999
INVENTOR(S) : Donnelly

It is certified that error appears in the above-identified patent and that said Letters Patent is hereby corrected as shown below:

Column 1,
Line 28, delete "diff-users" and insert --diffusers-- therefor;

Column 3,
Line 60, after "FIG. 1" insert --is--;

Column 8,
Line 52, delete "8" and insert --1-- therefor;
Line 55, delete "9" and insert --1-- therefor
Line 58, delete "10" and insert --11-- therefor
Line 64, delete "11" and insert --12-- therefor;

Signed and Sealed this

Third Day of July, 2001

*Attest:*

NICHOLAS P. GODICI
*Attesting Officer*   *Acting Director of the United States Patent and Trademark Office*